TELEMETERING SYSTEM

Filed July 23, 1964 3 Sheets-Sheet 1

INVENTORS.
Philip L. Epstein &
Frank Pribila
BY Morse, Altman & Oates
ATTORNEYS

TELEMETERING SYSTEM

Filed July 23, 1964 3 Sheets-Sheet 2

INVENTORS.
Philip L. Epstein
BY & Frank Pribila
Morse, Altman & Oates
ATTORNEYS

TELEMETERING SYSTEM

Filed July 23, 1964 3 Sheets-Sheet 3

INVENTORS
Philip L. Epstein
+ Frank Pribila
Morse, Altman + Oates
ATTORNEYS

United States Patent Office 3,387,296

Patented June 4, 1968

3,387,296
TELEMETERING SYSTEM

Philip L. Epstein, West Caldwell, and Frank Pribila, East Brunswick, N.J., assignors to Quindar Electronics Incorporated, Bloomfield, N.J., a corporation of New Jersey Filed July 23, 1964, Ser. No. 384,754
2 Claims. (Cl. 340—186)

The present invention relates to telemetering wherein the electrical output signal of a primary instrument transducer or the like is directed via a telemetering transmitter to a telemetering receiver which restores the original form of the input signal for display by an indicator or a recorder. Difficulties have been encountered in the telemetering of analog signals in that encoding the transmitted signal as a function of analog input in a form which will not suffer degradation during transmission and generating a corresponding output as a function of the received signal have suffered from error due to the requirement that the physical system conform within inconvenient tolerances to theoretical circuit design. The present invention contemplates a telemetering system of the foregoing type in which inherent accuracy is conveniently achieved by the selection of particular components.

Primary objects of the present invention are the provision of a novel telemetering system involving the transduction of an analog voltage level to a representational frequency for transmission and the transduction of the representational frequency to a functionally related voltage level upon reception: in which a transmitter and a receiver both are characterized by like frequency-to-voltage converters which inherently control their operations; in which the frequency-to-voltage converters both include transformers, with cores of magnetic material having a square hysteresis loop, which control the transmitter by a negative feedback voltage and control the receiver by an inherently analogous voltage; in which solid state components exclusively are utilized and, particularly, in which a field effect transistor is utilized as a chopper to permit drift-free amplification of the input signal level in the transmitter; and in which circuit design is less critical and of greater reliability because voltage and frequency may be nonlinearly related but will be precisely indicative of analog values because of the inherent correspondence in the transmitter and receiver.

Other objects of the present invention will in part be obvious and will in part appear hereinafter.

The invention accordingly comprises the system, its components and their interrelationships which are exemplified in the disclosure hereof. For a fuller understanding of the nature and objects of the present invention, reference should be had to the following detailed description, taken in connection with the accompanying drawings, wherein.

BLOCK DIAGRAM OF FIGS. 1 AND 2—TRANSMITTER AND RECEIVER

Generally, the illustrated transmitter is designed to accept an input analog signal in the form of a low voltage level, say ranging from 0 to 10 millivolts, from a thermocouple or other transducer. The transmitter converts the input analog voltage to a corresponding analog signal in the form of an analog frequency, say in the range of from 5 to 25 cycles per second. The transmitter applies the analog frequency as amplitude or frequency modulation to a suitable audio or radio frequency carrier. In this form the signal may be transmitted for any distance without significant degradation. The receiver detects the carrier wave and regenerates the analog frequency. The receiver finally converts the analog frequency to an output analog signal in the form of a voltage level corresponding to the voltage level of the input analog signal. The output analog signal is applied to a suitable readout such as a D'Arsonval meter.

Figure 1:
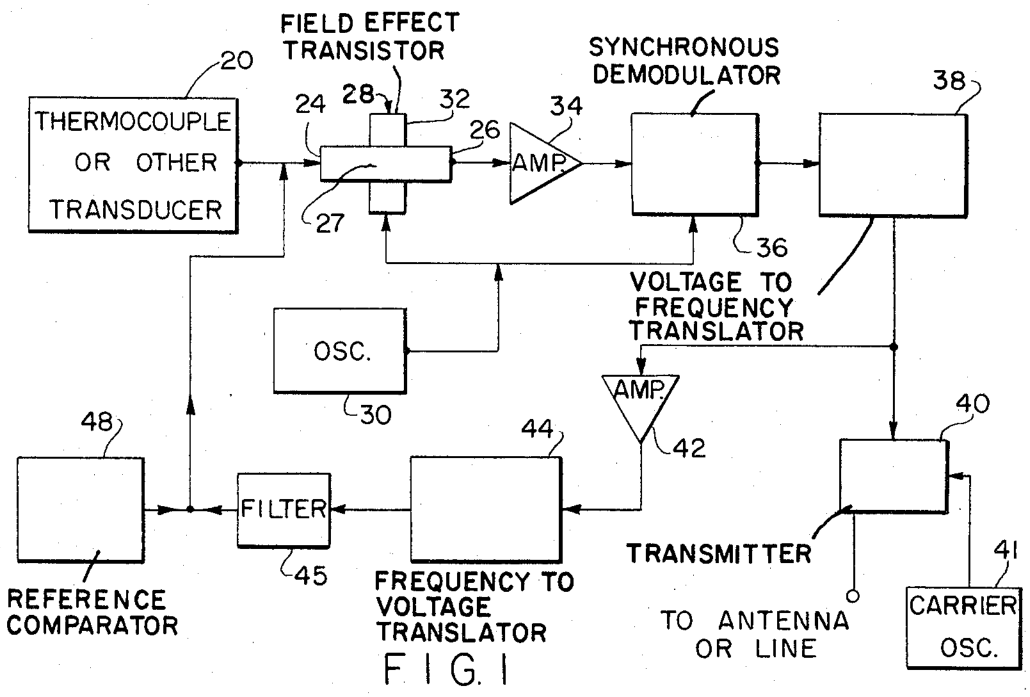
FIG. 1 is a block diagram of the transmitter of a preferred telemetering system of the present invention.

The signal from transducer 20 in FIG. 1 is applied initially across the source 24 and the drain 26 of a field effect transistor 28. The resulting output signal is chopped by the application of an alternating current signal from an oscillator 30 to the gate 32 of field effect transistor 28. In conventional fashion, field effect transistor 28 includes an elongated bar constituting a path 27 between source 24 and drain 26, surrounded by an annular ring constituting gate 32 capable of establishing an adjustable field within the path. Path 27 is composed of N-type semiconductor and gate 32 is composed of P-type semiconductor, both being doped with suitable impurities and forming a junction therebetween. The composition of the bar and the composition of the gate ordinarily are silicon or germanium with an alloy of their compositions at their interface. The application of a small voltage across the source and the drain produces a large current flow because of the low intrinsic resistance of the bar. Gate 32 generates space charge regions or a field effect within path 27 in such a way as to have a strong influence on the conductivity of the path between the source and the drain. At low levels of gate bias and drain supply voltage, conductivity between source and drain depends upon the width of the current flow path allowed by the space charge regions. At higher reverse gate voltages, the space charge regions meet in such a way as to cause pinch-off in path 27 between the source and the drain. Thus the signal actually applied by oscillator 30 is of sufficient magnitude to alternately cause pinch-off and non-pinch-off, i.e., chopping.

The resulting chopped signal is amplified by an A.C. amplifier 34 and reconverted by a synchronous demodulator 36 to a direct current level that is functionally related to the original direct current level of the signal from transducer 20. Synchronous demodulator 36 is controlled by a signal from the same oscillator 30 that controls gate 32 for the purpose of synchronization. The amplified D.C. signal is applied to a voltage to frequency translator 38 for translation to a frequency analogous to the input voltage. A transmitter 40 impresses the resulting frequency on an audio or radio frequency carrier. Also the signal from voltage to frequency translator 38 is applied through an amplifier 42 to a frequency to voltage converter 44. The frequency to voltage converter comprises a toroidally wound transformer, the core of which is composed of a coil of thin tape of any of several magnetic alloys having a "square" hysteresis loop. The core, by virtue of this property, has a sharply defined saturation flux density which is very largely unaffected by temperature and other characteristics of the environment. The input signal applied to the primary winding of this transformer is of sufficient magnitude to drive the core from positive to negative saturation or vice versa on each half cycle of the analog frequency signal. Each transition of the core from positive to negative or negative to positive saturation results in a pulse of voltage at the transformer secondary, the time-voltage integral of which is independent of the driving voltage, the temperature and other environmental factors. The train of alternating pulses resulting at the secondary of the transformer is rectified to produce a train of unidirectional pulses, which are smoothed in a filter 45, consisting of non-critical passive network of resistors and capacitors, to obtain a D.C. voltage that depends solely upon the analog frequency output of the voltage-to-frequency converter 38. The difference between this D.C. voltage output and a D.C. reference voltage at 48 is applied as a negative feedback signal to the input of field effect transistor 28. It is intended that the gain of amplifier 34 and of voltage to frequency converter 38 be sufficiently high for the performance of the entire transmitting system to be substantially controlled by the characteristics of feedback path 42, 44, 45, which contains only non-critical, passive components of the highest inherent stability. It should be noted that the only relevant property of the feedback path is its stability. The linearity of the response is of no consequence because a matching set of components in the system receiver will exactly compensate for any non-linearities present.

Figure 2:
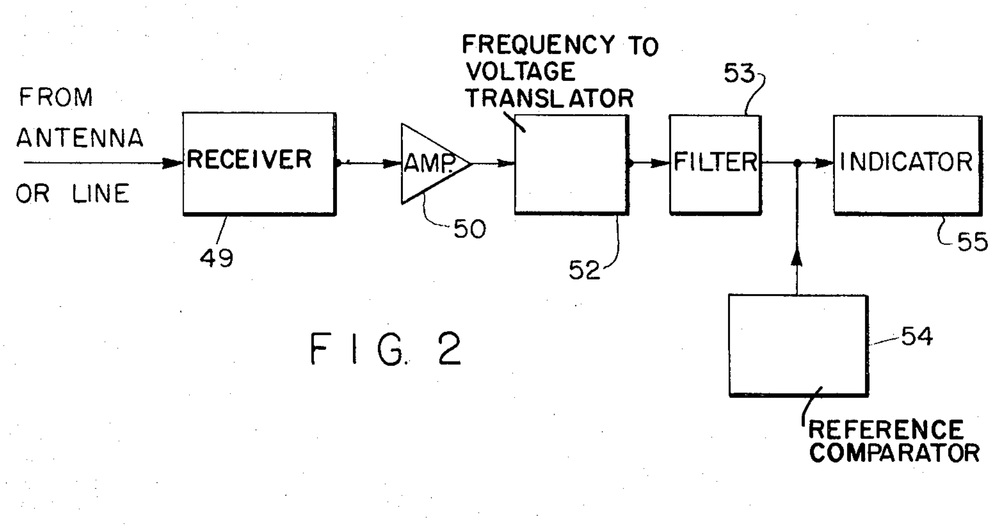
FIG. 2 is a block diagram of the receiver of the system of FIG. 1.
Figure 3:
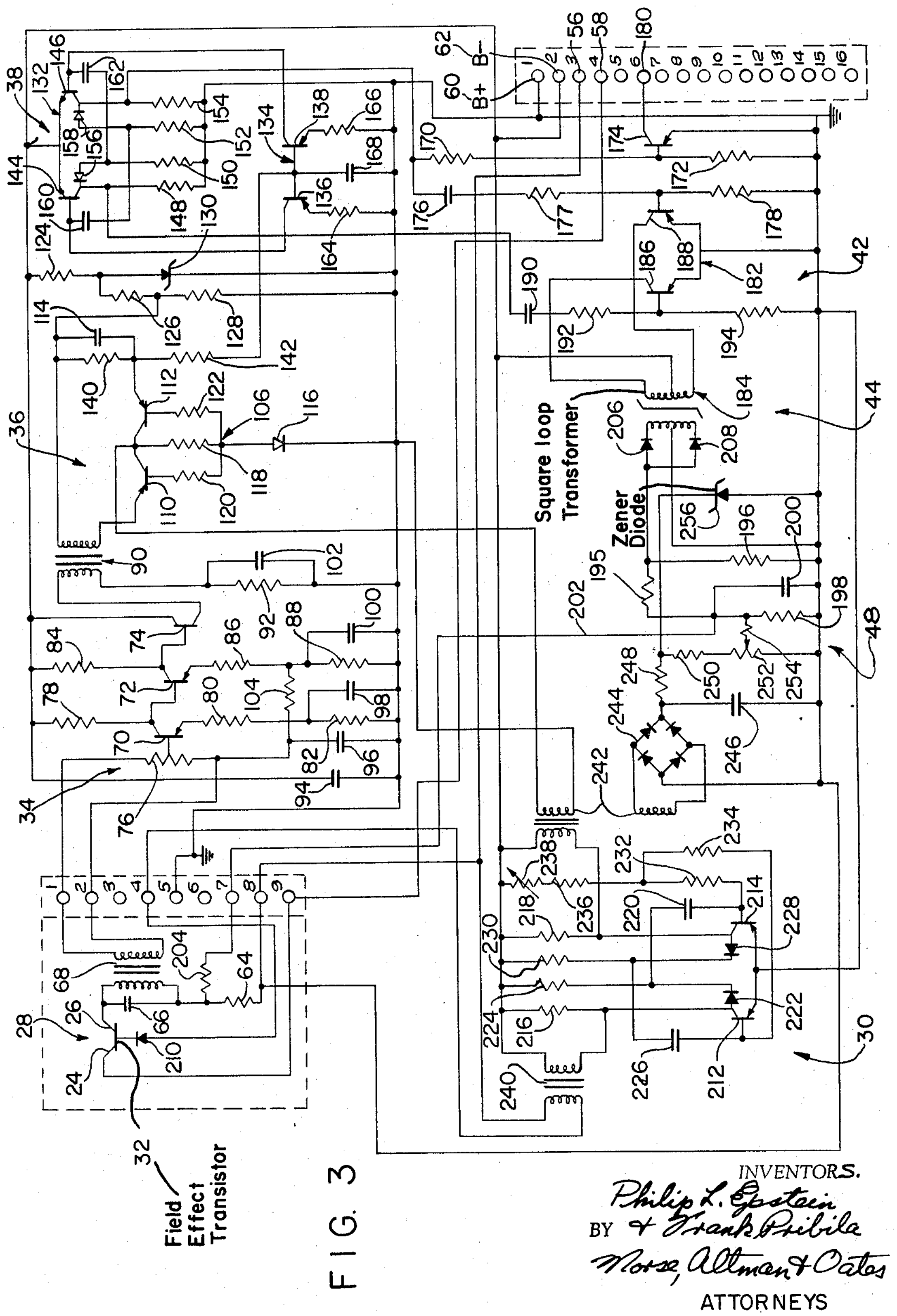
FIG. 3 is an electrical schematic diagram of the transmitter of FIG. 1.
Figure 4:
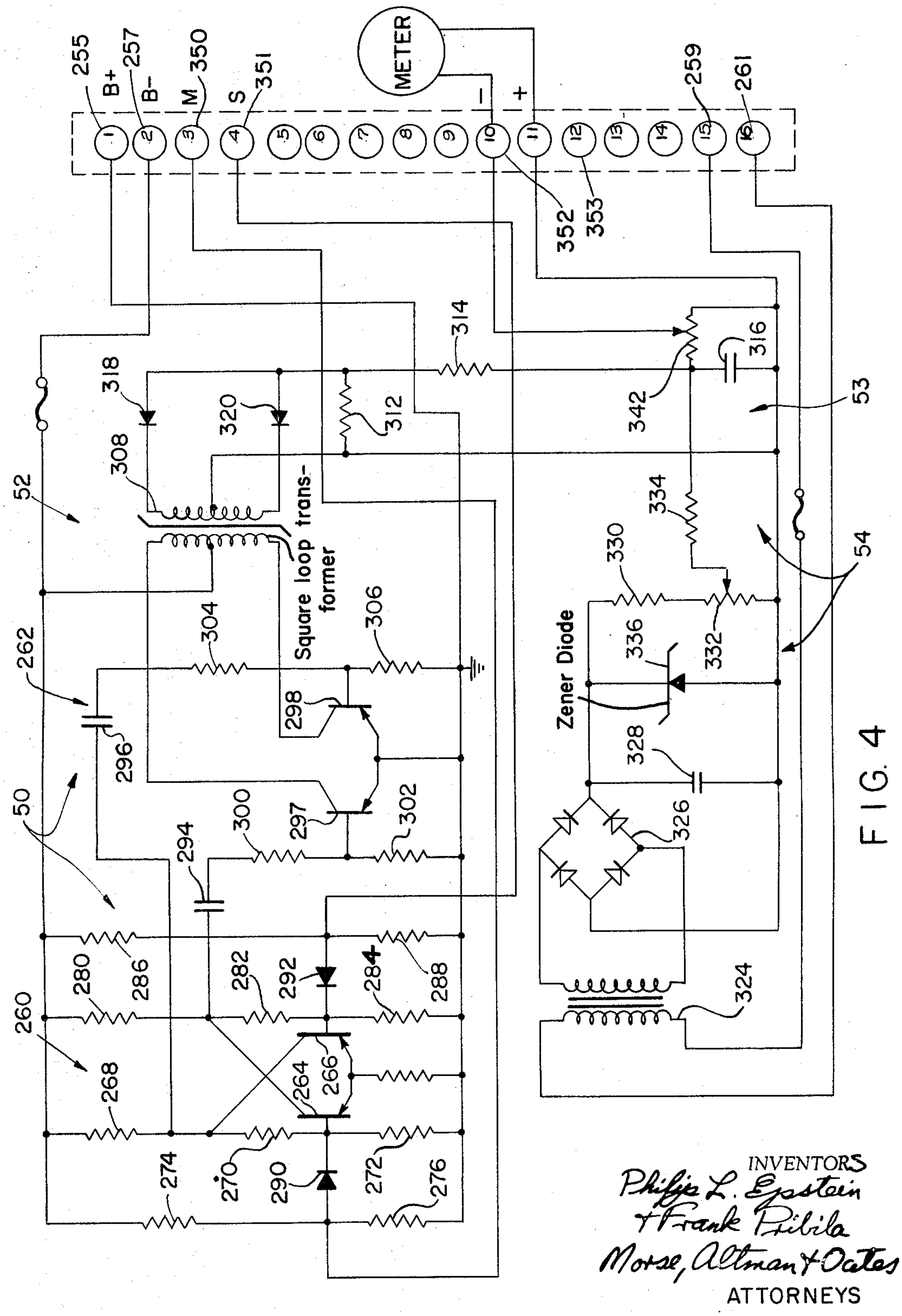
FIG. 4 is an electrical schematic diagram of the receiver of FIG. 2.

The receiver of FIG. 2 receives the signal output of the transmitter of FIG. 1 and demodulates this signal as at 49 for decoding. Decoding is effected by amplifier 50, frequency to voltage converter 52, filter 53 and reference comparator 54, which are identical respectively to amplifier 42, frequency to voltage converter 44, filter 45 and reference comparator 48 of the feedback loop of the transmitter. Thus, as indicated above, the decoding system of the receiver of FIG. 2 and the controlling feedback loop of the transmitter of FIG. 1 are inherently analogous.

SCHEMATIC DIAGRAM OF FIGURE 3—TRANSMITTER

The input signal is applied at terminals 56 and 58. From terminal 58 the signal passes through field effect transistor 28 from source 24 to drain 26. As explained previously, field effect transistor 28 is rendered alternately conducting and nonconducting by an oscillator signal applied to its base 32. Thus the input D.C. signal is converted to a unidirectional pulse train which next passes through the primary of an input transformer 68 and then through a resistor 64 where it is combined in opposition with the feedback signal arriving through a resistor 204. The unidirectional pulses at the primary of transformer 68, which is associated with bypass capacitor 66, appear as an alternating current in the transformer secondary. This alternating current is amplified by three stage transistor amplifier 34, comprising transistors 70, 72, and 74 together with associated biasing resistors, load resistors and bypass capacitors. The design of this amplifier is conventional. The signal from the secondary of transformer 68 is applied to the base of transistor 70 through a load resistor 76. The collector and emitter of transistor 70 are biased between B+ and B— by resistors 78, 80 and 82. The output at the collector of transistor 70 is applied to the base of transistor 72. The collector and emitter of transistor 72 are biased between B+ and B— by resistors 84, 86 and 88. The output at the collector of transistor 72 is applied to the base of transistor 74. The collector of transistor 74 connected directly to B+ and the emitter of transistor 74 is connected through the primary of a transformer 90 and a biasing resistor 92 to B—. A resistor 104 connects one terminal of the secondary of transformer 68 to a junction between resistors 86 and 88. Suitable bypass capacitors 94, 96, 98, 100 and 102 are provided across their associated resistors. The last stage of the amplifier, including transistor 74, is an emitter follower, the output of which is applied to the primary of a transformer 90.

The secondary of transformer 90 feeds synchronous demodulator 36. Synchronous demodulation of the chopped input signal is necessary in order to preserve the polarity of the input signal at the output. Synchronous demodulator 36 comprises transistors 110 and 112 connected back to back in a series arrangement, the purpose of which is to minimize the voltage introduced into the circuit by the switching action of the transistors. Transtistors 110 and 112 are turned on and off simultaneously by a voltage from the same oscillator which is modulating the input voltage in field effect transistor 28. A rectifying diode 116 is connected between B+ and three bias resistors 118, 120 and 122. Resistor 118 is connected between diode 116 and the collectors of transistors 110 and 112. Resistors 120 and 122 are connected between diode 116 and the bases respectively of transistors 110 and 112. The D.C. output voltage resulting from the synchronous demodulation process appears across a resistor 140, and is smoothed by a filter capacitor 114 across resistor 140. This D.C. output voltage is added to a D.C. voltage which is derived from a Zener diode 130 and a resistor divider comprising resistors 124, 126 and 128.

This combined voltage passes through resistor 142 and is applied to the bases of a control network 134, including two transistors 136 and 138, of voltage to frequency converter 38. The collector currents of transistors 136 and 138 are used to discharge a pair of capacitors 160 and 162 which in turn control the frequency of a multivibrator comprising transistors 144 and 146. In conventional fashion, transistors 144 and 146 of multivibrator 132 are cross-coupled to each other between B+ and B—. The emitters of transistors 144 and 146 are coupled to each other. The bases and the collectors are cross-coupled through a first pair of parallel resistors 148, 150 and a second pair of parallel resistors 152, 154. Resistors 150 and 152 are in series with diodes 156, 158, respectively. The base of transistor 144 is coupled via capacitor 160 to the collector of transistor 146 at a point between diode 158 and resistor 152. The base of transistor 146 is coupled to the collector of transistor 144 via capacitor 162 at a point between diode 156 and resistor 150. The emitters of transistors 136 and 138 are biased by resistors 164 and 166, respectively, a capacitor 168 being provided from the junction between the bases of transistors 136 and 138.

The voltage in the input circuit has thus been amplified and converted to a frequency analog, a portion of which appears at the junction between resistors 170, 172 for application to the base of output transistor 174 in order to produce an output on terminal 180. This output is suitable for modulating an audio tone or radio frequency carrier. At the same time, another portion of the output of the voltage to frequency converter 38 is applied amplifier 42.

Amplifier 42 includes a pair of blocking capacitors 176 and 190, through which the signal is applied to the bases of a pair of core driver transistors 186 and 188 across resistors 177, 178 and 192, 194. These transistors amplify the output of the voltage to frequency converter to a pulse train of sufficient magnitude to drive the core of the square loop transformer 184 from positive to negative or from negative to positive saturation on each half cycle of the output frequency. As previously explained, this core is the primary component of frequency to voltage converter 44. The resulting constant amplitude output pulses from the transformer secondary are converted to unidirectional pulses by rectifiers 206 and 208, and are filtered to a relatively pure D.C. by a filter network comprising a capacitor 200 and resistors 194, 195, 196 and 198. The combination of the transformer with square loop core 184 and the filter network just described comprise a frequency to voltage converter of the highest stability, employing only passive components.

The voltage resulting at the output of frequency to voltage converter 44, appearing across capacitor 200, is combined in reference comparator 48 with a reference voltage derived from a Zener reference diode 256. The sum of these two voltages (which is actually a difference since the two voltages are arranged to be of opposite polarity) is applied through feedback resistor 204 to resistor 64, where it opposes the flow of current in the input circuit. The feedback voltage appearing across resistor 64 is approximately ninety-nine percent of the applied input signal, so that the so-called feedback factor is approximately 100. In accordance with well known feedback principles, this results in input-output characteristics of the entire device being dominated entirely by the properties of the stable, passive feedback path established by portions 42 and 44 of the transmitter.

Oscillator 30 serves to drive field effect transistor 28 and transistors 110, 112 of the synchronous demodulator 36. This oscillator is in the form of a free running multivibrator including transistors 212 and 214 with associated cross-connected feedback capacitors 220 and 226 and the usual biasing and load resistors. The junction between the emitters of transistors 212 and 214 is connected to ground. The collectors of transistors 212 and 214 are connected to B— through resistors 216 and 218. The collector of transistor 212 is coupled to the base of transistor 214 via a capacitor 220. The input terminal of capacitor 220 is connected between a diode 222 and a resistor 224 that extends between the collector of transistor 212 and B—. Similarly, the collector of transistor 214 is coupled to the base of transistor 212 via a capacitor 226. The input terminal of capacitor 226 is connected between a diode 228 and a resistor 230 that extend between the collector of transistor 214 and B—. The bases of transistors 212 and 214 are biased by a network including resistors 232, 234, 236 and 238. The output of this multivibrator is applied to the chopper transistor through an isolating transformer 240 and is applied to synchronous demodulator 36 through an isolating transformer 242. Transformer 242 has an additional secondary, the output of which is rectified in bridge rectifier 244 and which serves to provide an isolated voltage supply for reference diode 256 previously mentioned.

SCHEMATIC DIAGRAM OF RECEIVER—FIGURE 4

The alternating current resulting from demodulation of the received signal in an audio tone receiver or a radio frequency receiver is applied to terminals 350 and 351 of the telemetering receiver. This signal is used to drive demodulator 260, an Eccles-Jordan circuit, comprising transistors 264 and 266 cross connected in the usual manner to provide a high degree of regeneration. The emitters of transistors 264 and 266 are coupled to each other. The bases and the collectors are cross-coupled via a first network of resistors 268, 270, 272, 274 and 276 and a second network 280, 282, 284, 286 and 288. A diode 290 is connected between the junction of resistors 274 and 276 and the junction of resistors 270 and 272. A diode 292 is connected between the junction of resistors 282 and 284 and the junction of resistors 286 and 288. The resulting output wave form appearing at capacitors 294 and 296 is a square wave regardless of the wave form of the input voltage.

This square wave is applied to amplifier 50 in the form of a core driver comprising transistors 297 and 298, which drive square loop core transformer 308 via resistors 300, 302, 304 and 306 in a manner identical to the operation of the corresponding parts of the transmitter. Also in an identical manner, the output pulses are rectified by diodes 318 and 320 to produce a unidirectional output pulse train, which is smoothed by the filter comprising resistors 312 and 314 and the capacitor 316. The voltage appearing across capacitor 316 is combined with a voltage from a Zener reference voltage source 336 and a dividing network of resistors 330, 332 and 334 in a manner exactly analogous to corresponding portions of the transmitter. The resulting voltage developed across resistor 342 is applied to output terminals 352 and 353 where it can be used to drive a D'Arsonval meter or other display or recording device. The similarity between the components of the receiver and the components of the transmitter feedback networks ensures that the voltage appearing at the output terminals 352 and 353 will be directly proportional to the voltage applied at the input terminals of the transmitter. An isolated supply of voltage for reference diode 336 is provided by a transformer 324, bridge rectifier 326, and filter capacitor 328.

CONCLUSION

The present invention thus provides a telemetering transmitter and receiver which are inherently matched in frequency and voltage translation by virtue of their like square loop transformer and filter networks. The square loop transformer network in the transmitter is used in a feedback circuit to ensure a particular output and the square loop transformer in the receiver provides a corresponding output, both outputs being of inherent correspondence. In other words, the object of recovering, at the receiver, a signal directly proportional to the transmitter input signal has been achieved without the use of critical circuitry to achieve linearity independently at each end of the system. Since certain changes may be made in the foregoing disclosure without departing from the scope of the invention herein involved, it is intended that all matter contained in the foregoing description and shown in the accompanying drawings shall be interpreted as illustrative and not in a limiting sense.

What is claimed is:

1. A telermetering system comprising a transmitter and a receiver, said transmitter including chopping means for converting an input analog voltage to a first functionally related frequency, high gain alternating current amplifying means for receiving said first functionally related frequency from said chopping means in order to produce an amplified signal, synchronous demodulating means for receiving said amplified signal from said high gain alternating current amplifying means to produce a first functionally related voltage, oscillating means for applying functionally related oscillating signals to said chopping means and said synchronous demodulating means, voltage to frequency translating means for receiving said first functionally related voltage from said synchronous demodulating means and for producing a second functionally related frequency, transmitting output means for directing said second functionally related frequency through a transmission medium, first frequency to voltage translating means for receiving said second functionally related frequency and producing a feedback signal, first reference comparator means for comparing a reference signal with said feedback signal and for applying a resulting control signal to said chopping means, said first frequency to voltage translating means having a transformer with a core characterized by a substantially square hysteresis loop by which its operation is substantially unaffected by environmental conditions, said receiver including second frequency to voltage translating means for receiving said second functionally related frequency through said transmission medium and for producing a preliminary output signal, said second frequency to voltage translating means having a transformer with a core characterized by a substantially square hysteresis loop by which its operation is substantially unaffected by environmental conditious, second reference comparator means for comparing a reference signal with said preliminary output signal in order to produce a final output signal for application to an indicator, said first frequency to voltage translating means and said first reference comparator means being matched with said second frequency to voltage translating means and said second reference comparator means in order to achieve inherent similarity between analogous signals controlled thereby, each of said first reference comparator means and said second reference comparator means being characterized by a Zener diode which provide a precise comparison signal, the Zener diode of the first reference comparator means and the Zener diode of said second reference character means being substantially alike, each of said first frequency to voltage translating means and said second frequency to voltage translating means including a non-critical passive network of resistors and capacitors, the linearity of response of said first frequency to voltage translating means and the linearity of response of said second frequency to voltage translating means being irrelevant because of matching which exactly compensates for any non-linearity present.

2. A telemetering system comprising a transmitter and a receiver, said transmitter including chopping means for converting an input analog voltage to a first functionally related frequency, high gain alternating current amplifying means for receiving said first functionally related frequency from said chopping means in order to produce an amplified signal, synchronous demodulating means for receiving said amplified signal from said high gain alternating current amplifying means to produce a first functionally related voltage, oscillating means for applying functionally related oscillating signals to said chopping means and said synchronous demodulating means, voltage to frequency translating means for receiving said first functionally related voltage from said synchronous demodulating means and for producing a second functionally related frequency, transmitting output means for directing said second functionally related frequency through a transmission medium, first frequency to voltage translating means for receiving said second functionally related frequency and producing a feedback signal, first reference comparator means for comparing a reference signal with said feedback signal and for applying a resulting control signal to said chopping means, said first frequency to voltage translating means having a transformer with a core characterized by a substantially square hysteresis loop by which its operation is substantially unaffected by environmental conditions, said receiver including second frequency to voltage translating means for receiving said second functionally related frequency through said transmission medium and for producing a preliminary output signal, said second frequency to voltage translating means having a transformer with a core characterized by a substantially square hysteresis loop by which its operation is substantially unaffected by environmental conditions, second reference comparator means for comparing a reference signal with said preliminary output signal in order to produce a final output signal for application to an indicator, said chopping means including a field effect transistor having a source, a drain and a gate, said input analog voltage being applied across said source and said drain, one of said functionally related oscillating signals being applied to said gate, each of said first reference comparator means and said second reference comparator means being characterized by a Zener diode which provides a precise comparison signal, the Zener diode of said first reference comparator means and the Zener diode of said second reference comparator means being substantially alike, each of said first frequency to voltage translating means and said second frequency to voltage translating means including a non-critical passive network of resistors and capacitors, said first frequency to voltage translating means and said first reference comparator means being matched with said second frequency to voltage translating means and said second reference comparator means in order to achieve inherent similarity between analogous signals controlled thereby, the linearity of response of said first frequency to voltage translating means and the linearity of response of said second frequency to voltage translating means being irrelevant because of matching which exactly compensates for any non-linearity present.

References Cited

UNITED STATES PATENTS

| | | | |
|---|---|---|---|
| 2,150,006 | 3/1939 | Parker | 340—187 |
| 2,929,052 | 3/1960 | Gilbert | 340—186 |
| 3,243,732 | 3/1966 | Schnitzler | 307—88.5 |
| 3,250,917 | 5/1966 | Hoffstein | 307—88.5 |
| 2,900,607 | 8/1959 | Barabutes | 340—208 |
| 3,097,351 | 7/1963 | Barabutes | 340—207 |

THOMAS B. HABECKER, *Primary Examiner.*

NEIL C. READ, *Examiner.*